Oct. 13, 1959  J. R. FURRER  2,908,229
ARTICULATED RAIL CAR WITH INDIVIDUALLY GUIDED AXLES
Filed April 22, 1954  7 Sheets-Sheet 1

INVENTOR.
JOHN R. FURRER
BY
George R. Ericson
ATTORNEY

INVENTOR.
JOHN R. FURRER
BY
George R Ericson
ATTORNEY

Fig. 9.

United States Patent Office 2,908,229
Patented Oct. 13, 1959

2,908,229

ARTICULATED RAIL CAR WITH INDIVIDUALLY GUIDED AXLES

John R. Furrer, Southport, Conn., assignor to A C F Industries, Incorporated, a corporation of New Jersey Application April 22, 1954, Serial No. 424,871

12 Claims. (Cl. 105—3)

This invention relates to articulated railway cars of the low floor type suspended on individually guided axles, and consists particularly in novel axle guiding means.

Railway passenger cars, according to general practice, are frequently as much as eighty-five feet long. To permit operation on curved track they are pivotally mounted at each end on a four or six wheel sprung and equalized truck. Cars of this type are generally independent, self-sufficient units, carrying their own power generating, air-conditioning, and sanitary facilities; they are dependent upon external means only for traction, braking and heating. For connection with other cars to form trains, they are equipped with automatic couplers, and steam and air-line connections. The above enumerated features make highly flexible train arrangements possible, since the number and type of cars in a train is susceptible of considerable variation. Cars of this type have several important disadvantages. First, as a result of their great length, they require extremely heavy framing. Second, such cars are prone to become derailed when rounding curves at high speed, due to the fact that the flange of the forward outside wheel of each truck strikes the rail at a positive angle with consequent tendency to climb over the rail-head. This tendency is restrained, of course, by the great weight supported by the wheels and by substantial speed reductions on curved trackage.

In order to obviate these disadvantages of standard equipment, articulated trains, consisting of a plurality of very short two-wheeled units, have been built, each of the units being provided with a single axle at one end, its opposite end being pivotally mounted on the wheeled end of the adjacent unit, the un-wheeled end of the leading unit being supported by the rear end of a multi-axle motor car. It is obvious that, although such trains eliminate the disadvantages enumerated above with respect to standard railway passenger cars, the units forming such a train are highly inter-dependent, with resultant lack of flexibility in train make-up as well as inability to remove bad order units from a train with ease. A further serious disadvantage of some trains of this type results from the fact that the axles are held transverse of the longitudinal axis of each unit at all times so as to cause the wheels to always attack the outside rail on curved trackage at a negative angle; obviously such trains can be operated safely in only one direction on curved trackage, since if they are reversed the wheels will attack the outer rails on curves at a positive angle.

Accordingly, it is an object of this invention to provide a railway car having the numerous advantages of the conventional double truck car, as set forth above, combined with the anti-derailment safety and lightweight features of the articulated trains described above. A further object is to provide novel axle guiding means for such a railway car, independent both of coupler actuation and semi-permanent linkage connections between adjacent cars.

I achieved these and additional objects by providing a car consisting of a four-wheeled unit, with the un-wheeled ends of a pair of two-wheeled units permanently coupled to each end of it, so that the resultant car in its preferred form consists of three approximately thirty-foot units and has wheels at each end. The ends are provided with suitable draft gear and automatic couplers preferably of the A.A.R. tightlock type, and cooperating detachable linkage means for guiding the end axles in response to the angularity between cars when the train is operating on curved trackage. The axles of the intermediate four-wheeled unit are guided in response to angularity between it and the adjacent two-wheeled units by linkage means permanently connecting each of the axles of the four-wheeled unit to the bodies of the adjacent two-wheeled units.

The above and other more detailed objects of the invention will be apparent to those skilled in the art from a study of the following description and accompanying drawings:

Figure 1:
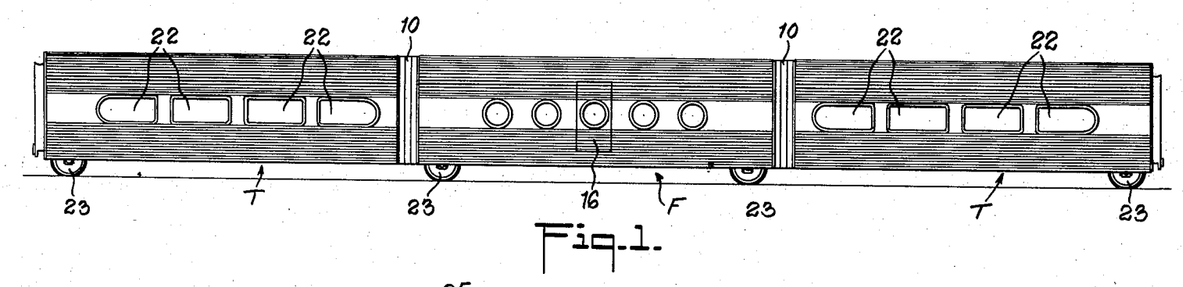
Fig. 1 is a side view of a car constructed according to my invention.
Figure 2:
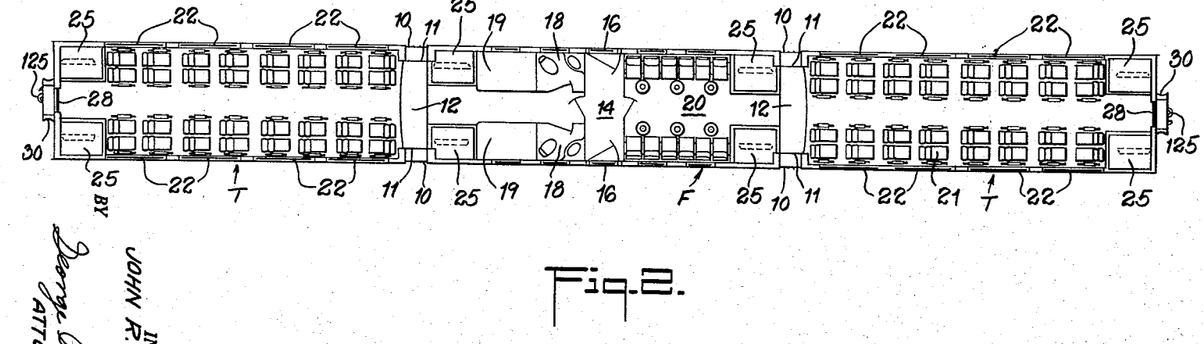
Fig. 2 is a plan view of the car shown in Fig. 1.

Referring now to the drawings, in which the letter R refers to conventional track rails, the car shown in Figs. 1–4 consists of a four-wheeled intermediate unit F and a pair of units T each having a wheel and axle assembly at its outer end remote from unit F and each supported at its inner or un-wheeled end by the adjacent end of four-wheeled intermediate unit F. The three units are permanently coupled to form a single car of approximately the same length as a conventional passenger car. The space between the intermediate unit and each of the two end units being enclosed by outer and inner diaphragms 10 and 11, respectively, and foot-plates 12. As shown in Fig. 2 a middle loading vestibule 14 having side entrance doors 16 is provided. With this arrangement saloons 18 are also provided in the intermediate unit F as well as air-conditioning lockers 19 and lounges 20. The two-wheeled end units T may be provided with reclining day-coach seats 21 and a plurality of windows 22. It is evident, of course, that the interior arrangement of the car is susceptible of considerable variation; for example, a loading vestibule might be provided at one or both ends instead of in the middle, saloons might similarly be located at the ends, the lounge section might be eliminated and the entire interior of the car provided with reclining seats. Similarly the car interior might be divided into various conventional types of sleeping rooms, or into kitchen and dining rooms, etc. It will be noted from Fig. 1 that wheels 23 protrude well above the underframing of the units.

Figure 8:
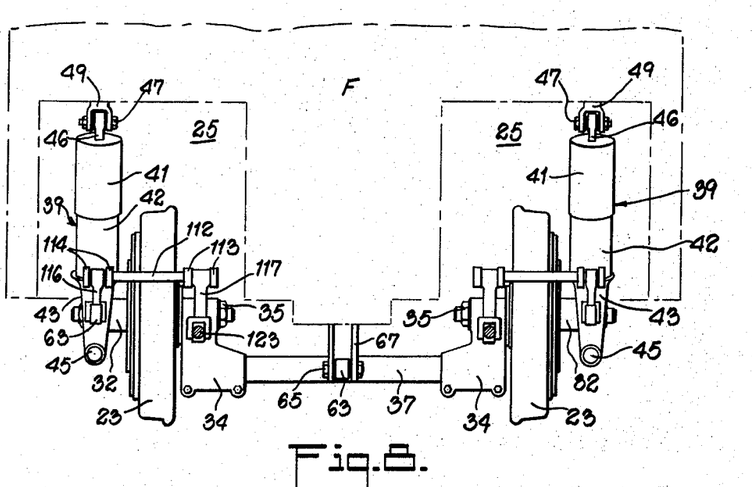
Fig. 8 is an end view of the linkage arrangement shown in Figs. 6 and 7.

To accommodate the wheels and suspension structure, which will be described in detail below, wheel wells 25 are provided at both ends of intermediate unit F and at the extreme outer end of each of the units T. Wells 25 are in each case laterally spaced to provide through-aisles extending from one end of the car to the other as best shown in Fig. 8. The space above the wheel wells may be utilized for various utilitarian purposes such as to accommodate electrical cabinets, luggage lockers, etc. The ends of the car are provided with train doors 28 and conventional vestibules 30 forming means for passage between connected cars.

Figure 6:
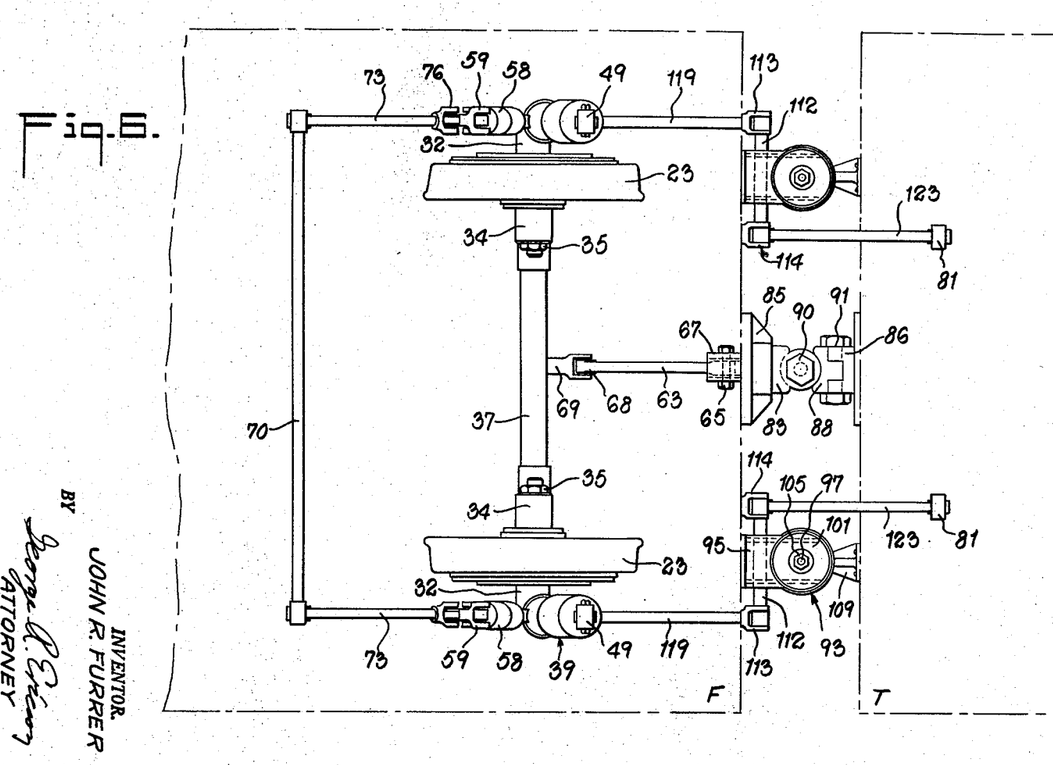
Fig. 6 is a plan view of the axle guiding linkage arrangement between the four-wheeled unit and an adjacent two-wheeled unit.
Figure 7:
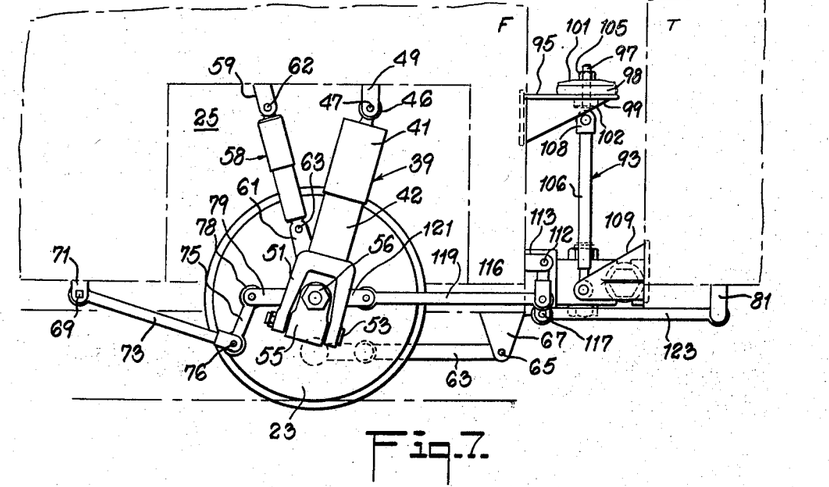
Fig. 7 is a side view of the linkage arrangement shown in Fig. 6.
Figure 16:
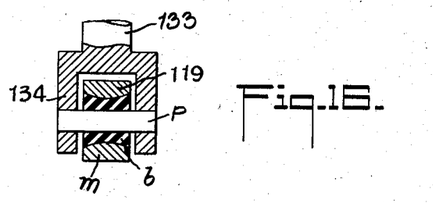
Fig. 16 is a sectional view of a pivot, used at many points in this construction, incorporating a rubber bushing.

The suspension and axle guiding means for the intermediate unit F is best shown in Figs. 6, 7 and 8 in which the numeral 23 refers to flanged wheels rotatably journaled on stub axles 32. Stub axles 32 are secured to downwardly extending arms 34 by nuts 35 and arms 34 in turn are clamped to a transversely extending beam 37, the entire assembly constituting a drop axle of the type disclosed in United States Patent No. 2,641,499 to A. A. Gassner. The drop axle structure is necessary in order to permit the low car aisle floor to extend between the wheel wells 25. The unit body is resiliently suspended on the drop axle by a resilient strut member generally indicated at 39. Strut member 39 consists of a pair of telescoping cylinders 41 and 42 which form a housing and guide means for a coil spring compressed between their extreme ends. The upper cylinder 41 is provided with an extension 46 for pivotal mounting at 47 on body bracket 49. The pivotal mounting 47 is of the type shown in Fig. 16 and consists of an enlarged double-flared opening in member 46 (corresponding to $m$ in Fig. 16), a pivot pin $p$ of smaller diameter than the minimum diameter of the opening, and a rubber bushing $b$ in the intervening space, whereby substantial universal movement of the strut is permitted with respect to the body. The lower strut cylinder 42 is provided with a downwardly extending yoke member 51. Yoke member 51 is secured at 53 to depending arm 55 which is secured to the outer end of each of the stub axles by a nut 56. To dampen oscillations in strut members 39 each of the yokes 51 is also connected to the body framing by means of a conventional hydraulic shock absorber 58 which is secured at one end to body bracket 59 and at the other end to yoke bracket 61 by means of pivots which are of the same type as shown in Fig. 16. From the foregoing it will be seen that the strut and shock absorber mounting permits considerable transverse movement of the axle as well as independent longitudinal movements of each end of the axle in addition to the resiliently opposed vertical movements of the body permitted by the sprung struts 39.

Additional means is provided for centering the axle with respect to the body and for dampening the amplitude of lateral rolling movements of the body with respect to the axle. The centering means consists of a longitudinally extending rod 63 mounted on a horizontal pivot 65 in bracket 67 which depends from and is rigidly secured to the body framing. Pivot 65 is not provided with a bushing of the type shown in Fig. 16, and consequently permits rotation of rod 63 only in a longitudinally extending vertical plane. The opposite end of rod 63 is secured by means of a resilient pivot 68 to a longitudinally extending bracket 69, which is rigidly mounted on drop axle beam 37, so that the axle structure is permitted substantially universal movement, to a limited extent about pivot 68. The means for dampening lateral rolling movements of the body consists of a transversely extending torsion bar 70 mounted at each end in a body bracket 71 and provided with longitudinally extending arms 73. Links 75 are connected at one end by transverse horizontal pivot 76 of the type shown in Fig. 16 to the free end of arm 73, and at their other end by means of a horizontally extending pivot 78, of the type shown in Fig. 16, to a horizontally extending bracket 79 on yoke member 51. It is evident from the foregoing that the axle structure is permitted some rotation in the horizontal plane about the pivot 68 with respect to the body. This movement is provided for in order to permit the axle to be guided by external means.

Unit T is secured at its un-wheeled end to unit F by a draft coupling consisting of a tongue 83 mounted for rotation about a longitudinally extending horizontal pivot in end weldment 85 of unit F, a bracket 86 secured to the adjacent end of unit T, and link 88 secured to tongue 83 by a vertical pivot 90 and to bracket 86 by a horizontal pivot 91, so that substantially universal relative movement is permitted between the two adjacent units F and T. Relative transverse rotational movements between the two bodies are restricted by carry-through devices generally indicated at 93. Carry-through devices 93 each consist of a shelf 95 secured to the end framing of unit F. Shelf 95 is provided with an opening to receive eye-bolt 97 which is resiliently secured to shelf 95 by a pair of rubber washers 98 and 99, above and below shelf 95 respectively, compressed between metal washers 101 and 102 by nut 105 on eye-bolt 97. Thus limited vertical movements of eye-bolt 97 are permitted, such movements being cushioned by the rubber washers 98 and 99. A rod 106 formed with a clevis 108 at its upper end for pivotal securement to the lower end of eye-bolt 97, is pivotally secured at its lower end to a bracket 109 extending longitudinally from the end framing of unit T, so that all rolling movements of unit F are resiliently transmitted to each of the units T. The above described structure 83–109 further constitutes means by which each end unit T has its unwheeled end tractively connected to and supported from an end of intermediate unit F.

The axle guiding means consists of a linkage arrangement secured at one end to the axle yoke 51 and at the other end to a bracket 81 depending from and secured to the underframing of the adjacent permanently coupled two-wheeled unit T. The axle guiding linkage includes a pair of transversely extending rods 112 rotatably journaled in clevise brackets 113 and 114 projecting from the end framing of unit F. Each rod 112 is provided with a pair of downwardly extending arms 116 and 117 having clevises at their lower ends. A radius rod 119 is pivotally secured at one end to the clevis of arm 116 and at the other end to a bracket 121 affixed to yoke 51, the pivotal connections in each case being of the type shown in Fig. 16. A link 123 is pivotally secured at one end to the clevis of arm 117 and at the other end to bracket 81 depending from the framing of unit T, the pivotal mountings at each end of link 123 being also of the type shown in Fig. 16. It is evident from the foregoing and from the diagrammatic showing of these parts in Fig. 4 that as the car built according to this invention rounds a curve the link 123 on the inside of the curve will be in compression, causing (in Fig. 7) a clockwise movement of arm 117, rod 112 and arm 116 and a corresponding movement of radius rod 119 and the end of the axle structure on the inside of the curve will move toward the left in Fig. 7. Conversely, link 123 adjacent the outside of the curve will be placed in tension so as to impart counter-clockwise movement to its arm 117, rod 112 and arm 116 with consequent movement of the outside radius rod and the end of the axle structure on the outside of the curve will move toward the right in Fig. 7. Thus the ends of both axle structures of unit F on the outside of the curve move apart and on the inside of the curve move toward each other and will be at all times guided so as to be co-linear with the radii of track curvature. In other words the vertical planes of the wheel flanges will be similarly moved and will at all times be tangential to the inner vertical edges of the track rails, regardless of the direction in which the car is being operated, or of the radius of track curvature.

Figure 9:
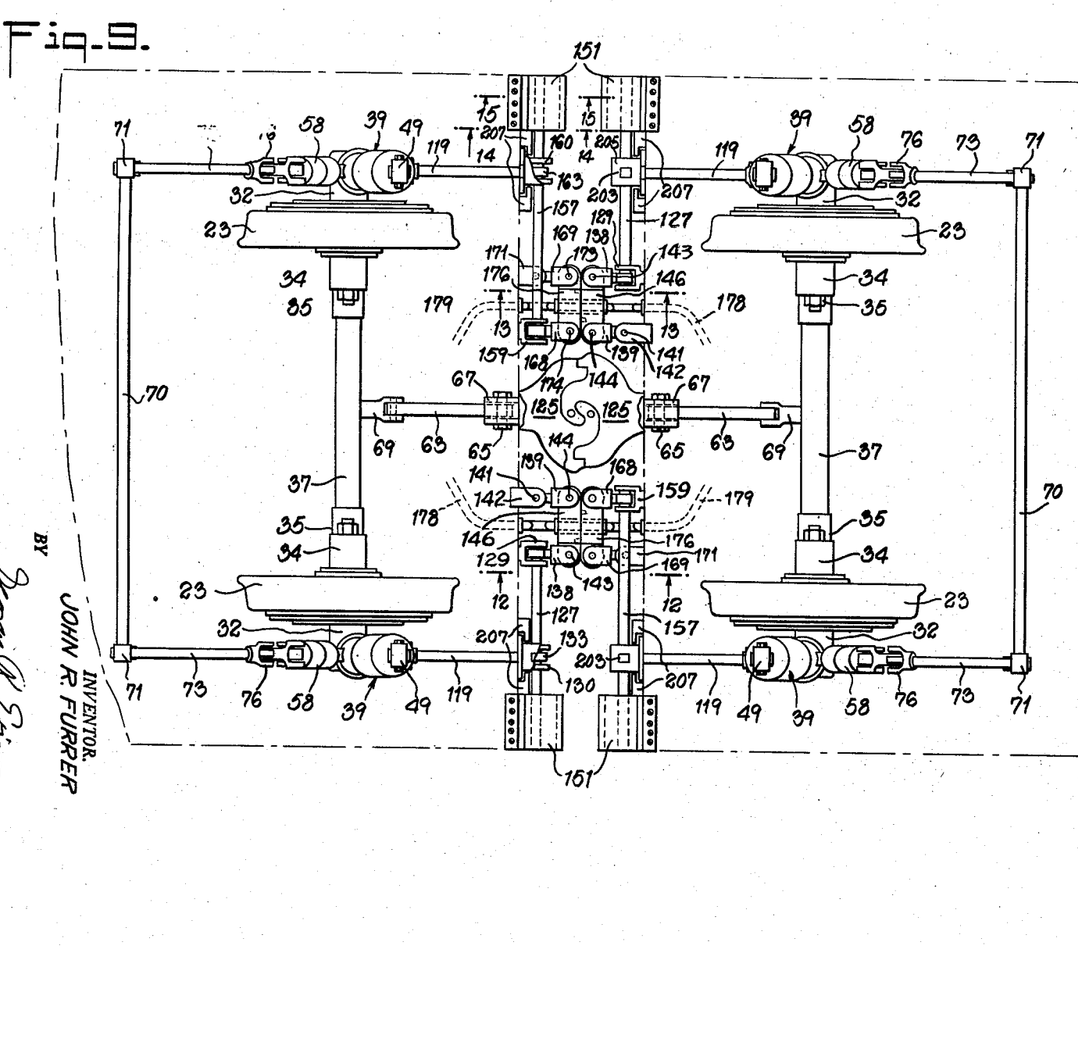
Fig. 9 is a plan view of the end axle guiding linkages of two connected cars.
Figures 10, 12, 13, 17:
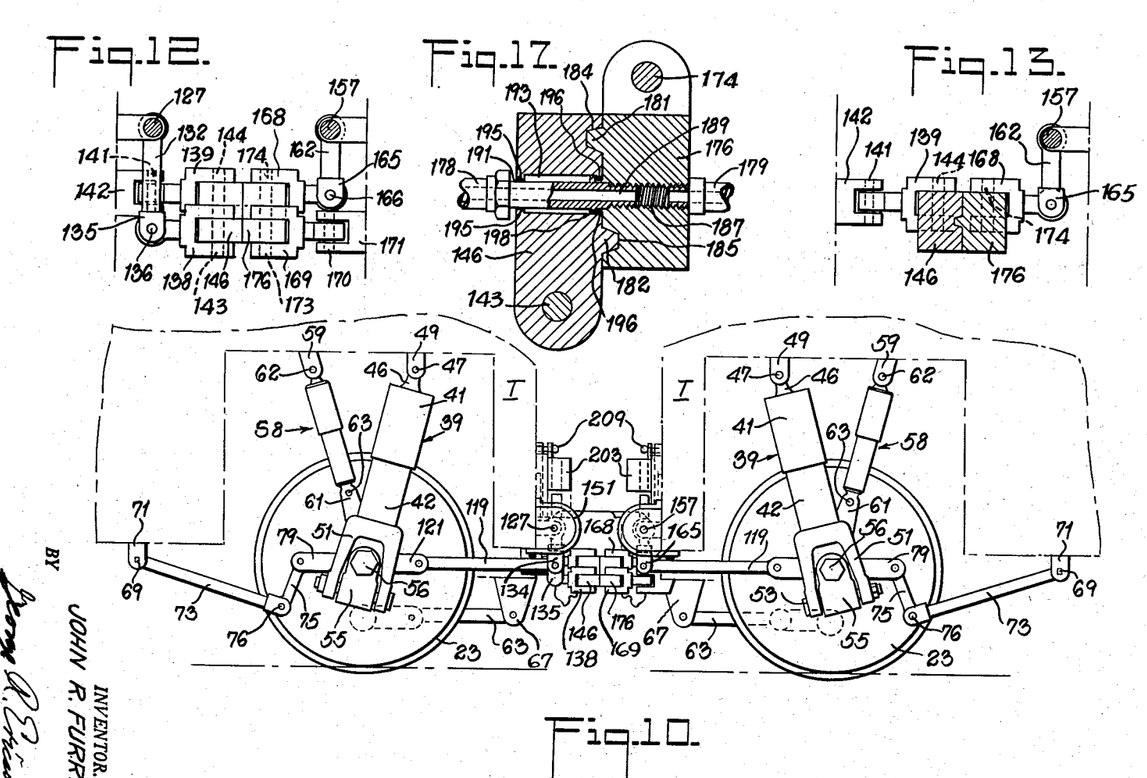
Fig. 10 is a side view of the end linkage arrangement shown in Fig. 9.
Fig. 12 is a vertical sectional view along the lines 12—12 of Fig. 9.
Fig. 13 is a vertical sectional view along the line 13—13 of Fig. 9.
Fig. 17 is a horizontal sectional view along the line 17—17 of Fig. 11.
Figure 11:
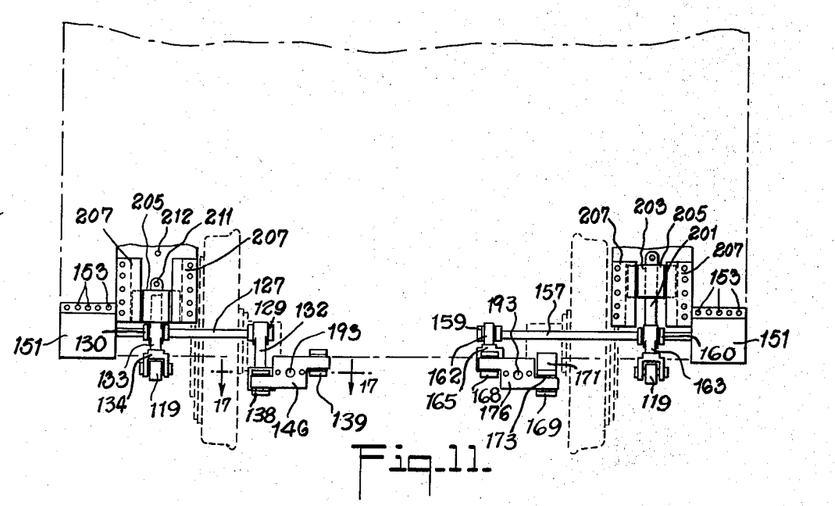
Fig. 11 is an end view of one of the end linkages shown in Figs. 9 and 10.
Figure 14:
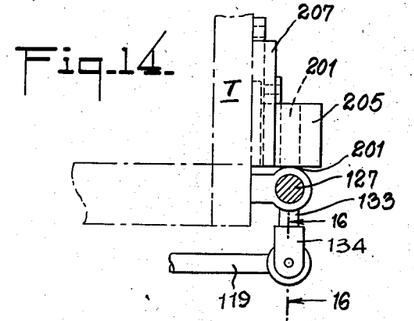
Fig. 14 is a vertical sectional view along the line 14—14 of Fig. 9.
Figure 15:
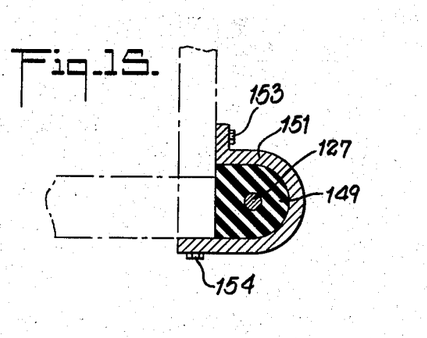
Fig. 15 is a vertical sectional view along the line 15—15 of Fig. 9.

Means for guiding the axles of the end two-wheeled units T are shown in Figs. 9–15 in which the same reference characters apply to the wheels, axle structure, centering and anti-roll devices as were used in Figs. 6–8. Inasmuch as this portion of the structure is the same on the end units T as on the intermediate unit F it will not be described again in detail. The axle guiding means, however, differ substantially from the system used between the F and T units, since it is essential or at least highly desirable that the axle guiding means of each car be easily connectable and equally easily separable from cooperating units on adjacent cars. It has been suggested that one way of achieving this end is to use radial tight-lock couplers as the actuating means for guiding linkages. The use of couplers and drawbars as guiding means has as a principle advantage the fact that additional guiding connections between adjacent cars may be omitted. It has, however, a serious disadvantage in that, as the adjacent car bodies swing laterally with respect to each other, as they frequently do even on straight track, the drawbar pivot points would be thrown out of longitudinal alignment, with consequent misguiding of the axles. Accordingly, I now provide axle guiding means, which are responsive to the angularity between separate independent car bodies but which are unaffected by relative lateral movements of the two bodies. In Figs. 9 and 10 the numeral 125 indicates a tightlock coupler head which, it will be understood, is resiliently mounted in the draft sill of the car by draft gear of conventional design (not shown). Each car end is provided on its right-hand side facing outwardly toward the end of the car with a transversely extending horizontal rod 127 rotatably journaled in a pair of laterally spaced clevis brackets 129 and 130, secured to the end framing of the car. Rod 127 is provided with a pair of downwardly extending arms 132 and 133 fast thereto. Arm 133 is formed with a clevis bracket 134 at its lower end, in which is pivotally mounted one end of a radius rod 119, the other end of radius rod 119 being pivotally secured to bracket 121 on the adjacent suspension yoke 51. Both pivotal mountings of radius rod 119 are of the rubber-bushed type shown in Fig. 16 so as to permit limited universal movement of the radius rod with respect to arm 133 and bracket 121. Arm 132 is similarly formed with a clevis 135 at its lower end providing a horizontal pivot 136 of the type shown in Fig. 16 for pivotally mounting longitudinally extending and longitudinally movable buffer clevis bracket 138. A similar buffer clevis bracket 139 is mounted on a vertical pivot 141 in bracket 142 which is secured to the body end framing. Brackets 139, 142 both project longitudinally outwardly from end unit T toward the adjacent coupled end unit. Clevis brackets 138 and 139 are provided with vertically arranged openings whereby to mount laterally extending buffing bars 146 on vertical pivot pins 143 and 144. It should again be noted in connection with the construction just described that the only pivots provided with bushings as shown in Fig. 16 are the pivots at the bottom of arms 132 and 133 and the pivot connecting the radius rod 119 to yoke bracket 121. It will be evident also from the foregoing description that if buffing bar 146 is pushed towards the car on which it is mounted it will rotate about its pivot 144 at its inner end, causing an inward movement of arm 132, a clockwise movement of rod 127, an inward movement of arm 133, and a corresponding inward movement of the radius rod 119 and connected end of the axle structure. Conversely if buffing bar 146 is pulled away from the end of the car to which it is pivotally secured, it will rotate about pivot 144, causing an outward or counter-clockwise movement of arm 132, rod 127 and arm 133, with a corresponding outward movement of the radius rod and the connected right-hand end of the axle.

Rod 127 extends into and is bonded to a soft rubber mass 149 which is bonded on its outer surface to a semi-cylindrical metal cover 151. Cover 151 is held against rotational movement by being bolted at 153 and 154 to the end framing of the car, so that rotational movements of rod 127 from its normal position, that is, with the axle structure perpendicular to the longitudinal axis of the unit and with the face of buffing bar 146 lying in a verical plane parallel to the car end. Thus, the assembly 149, 153 constitutes a rubber torsion spring the purpose of which is to maintain the buffing bars 146 in a position for easy connection to cooperating buffing bars on adjacent cars.

On its left-hand side facing outwardly toward the end of the car each car end is provided with a rod 157 which is journaled in clevises 159 and 160 mounted on the car end framing. Rod 157 is provided with a pair of downwardly extending arms 162 and 163 fast thereto. Arm 163 is provided with a clevis at its lower end to pivotally receive the end of left-hand radius rod 119, which in turn is pivotally secured at its other end to bracket 121 of left-hand axle yoke 51, both pivotal connections of radius rod 119 being of the type shown in Fig. 16. Arm 162 is provided with a clevis 165 at its lower end including a horizontal pivot 166 for mounting longitudinally extending and longitudinally movable buffing bar supporting clevis bracket 168. A similar buffing bar supporting clevis bracket 169 is mounted on a vertical pivot 170 in body bracket 171. Brackets 169, 171 both project longitudinally outwardly from end unit T toward the adjacent coupled end unit. Each of the buffing bar mounting clevis brackets is provided with openings to receive vertical pivot pins 173 and 174 which pass through registering openings in each end of buffing bars 176. It will be noted, in connection with the left-hand linkage system, that a torsion spring arrangement identical to the torsion spring arrangement 151–154 is provided for resiliently retaining the linkages and buffing bars at a normal position to facilitate coupling. Also, buffing bars 176 swing about their pivots 173 in the brackets 169 at the outer ends of the bars 176.

The buffing bars each consist of a laterally extending block provided at each end with a perforated extension adapted for pivotal mounting in the jaws of the buffing bar mounting clevises. The buffing bars 146 and 176 are shown in horizontal cross-section in Fig. 17 in which it will be noted that an air line 178, 179 passes through the buffing bars. Means is provided for aligning the bars consisting of a pair of horizontally spaced registering bosses 181 and 182 and cooperating recesses 184 and 185. For locking the bars together the air line passage 187 of left-hand bar 176 is tapped to receive the threaded end 189 of male air line fitting 191. Male fitting 191 is rotatably secured to air hose 178, and passes through air line opening 193 in right-hand buffing bar 146. Air line opening 193 is provided with shoulders 195 and 196 respectively adjacent the rear and forward faces of the buffing bar, and air line fitting 191 is provided with a cooperating annular shoulder 198, so that the two buffing bars may be locked together by the interaction of shoulders 198 and 196 when air line fitting 191 is tightly screwed into passage 187. It should be noted that connecting the air lines through the buffing bars also provides an important safety feature in that separation of the bars, with consequent misguiding of the axle, also separates the air lines, thereby actuating the brakes, and stopping the train before derailment.

Rear shoulder 195 merely serves to prevent fitting 191 from becoming separated from the buffing bar 146.

Figure 3:
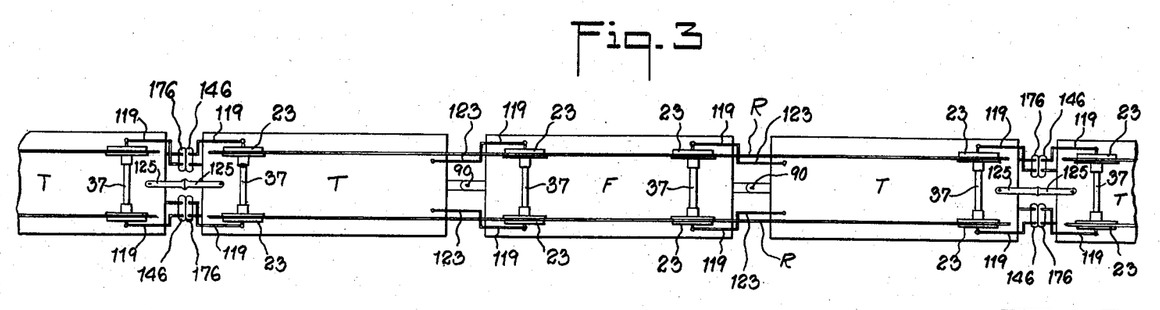
Fig. 3 is a schematic plan view of the axle guiding system of the car shown in Figs. 1 and 2.
Figures 4, 5:
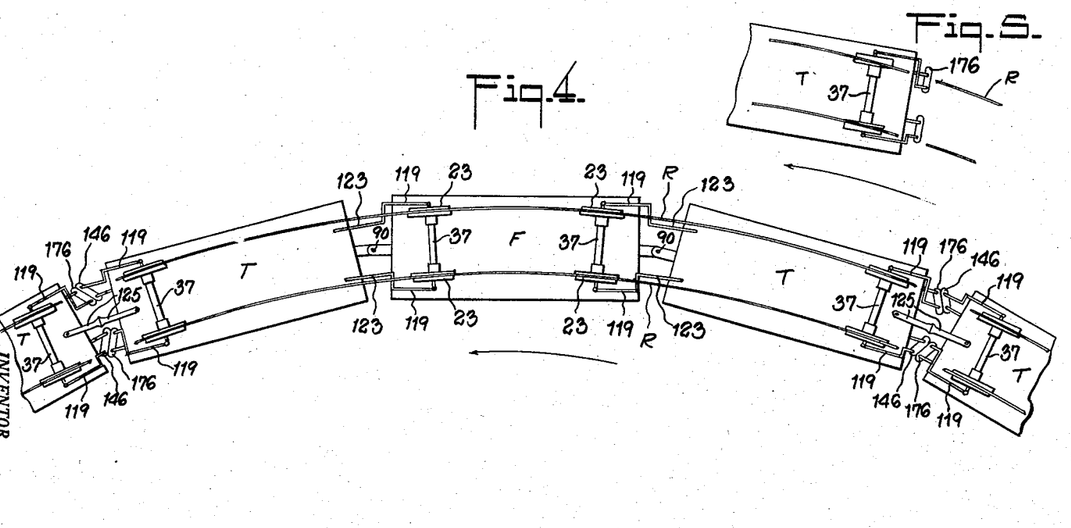
Fig. 4 is a schematic view showing the axle guiding system of Fig. 3 as it appears on curved trackage.
Fig. 5 is a partial schematic view of the rear end of a car built according to my invention as it would appear when coupled to the rear end of a train rounding a curve.

The interaction between the devices on connected cars can best be seen in Figs. 9 and 10 and in the schematic views of Figs. 3 and 4. It will be noted in Fig. 9 that the left-hand linkage of each car engages the right-hand linkage of the other car. It will also be noted that the body connections 139—141 of the right-hand buffing bars 146 of each car are longitudinally aligned with the linkage connections 162, 168 of the left-hand buffing bars 176 of the other car, and that the body connections 169, 171 of the left-hand buffing bars of each car are longitudinally aligned with the linkage connections 132, 138 of the right-hand buffing bars of the other car. Any change in the longitudinal spacing between the cars is transmitted through the body connected end of each of the buffing bars to the suspended end of the adjacent buffing bar and thence through arms 132 and 162, rods 127 and 157, and arms 133 and 163 to the radius rods and thence to the axle ends. In other words the buffer blocks being joined together form in effect a solid block pivoted at 141 to one car and at 170 to the other car, that is, at diagonally opposite corners. As the cars move toward or away from each other as permitted by the coupler springs the blocks will swing equal amounts and assume an angular position with the vertical planes of their faces converging at a point on the longitudinal center line of the cars. This will impart compression or tension to links 119 of each car in equal amounts and the axles will not be turned. On the other hand when the cars enter a curve the blocks on the inside of the curve center line will swing a lesser amount than will the blocks on the outer side of the curve center line. From the linkage connections it will be seen that as a train rounds a curve and the inner portions of the car ends are drawn closer together the linkages will cause the inner wheels to be further separated longitudinally, that is, pushed inboard toward the longitudinal center of the car, and will cause the outer wheels to be drawn closer together longitudinally. This movement is the opposite of that desired, however, the linkages at the outer side of the curve center line draw the outer wheels closer together at a lesser rate than the outer side of the cars separate, and the linkages at the inner side of the curve center line separate the inner wheels at a lesser rate than the inner side of the cars move together with the result that the vertical planes of all the wheels are in substantially tangential relation with the vertical edges of the rails.

The relationship between the end guiding linkages on curved track can best be seen in Fig. 4, which shows not only the end linkages of Figs. 9–17 but also the intermediate linkages of Figs. 6–8. It is believed that the operation of the linkages is self-evident from Fig. 4 in view of the descriptions heretofore given of their structure and inter-relationship.

Referring back to Figs. 9, 10, 11, and 14, means is shown for positively locking the end linkage on any car so that the last axle in the train is held perpendicular to the longitudinal axis of the car and cannot whip or hunt as it otherwise would. This locking means consists of an upward extension 201 on arms 133 and 163. Extension 201 is adapted to register with a vertical opening 203 in lock blocks 205 which are slidably mounted for vertical movement in guideways 207. Normally to permit free action of the linkages, blocks 205 are held in their uppermost position as shown in Fig. 10 and on the right-hand side of Fig. 11 by pins 209 inserted through registering holes 211 and 212 in the block and guide respectively. The purpose of providing means for locking the axles in a position transverse of the units T is to permit operation of the car at the rear end of trains, since without such locking means and without any connection to adjacent cars for guiding the axle, the axle would be loose and would be able to rotate freely within certain limits about its central pivot 68. Obviously such a condition would be untenable and would lead to derailment. By providing means for locking the axle, the vertical planes of the rear wheels are always retained in tangential relation to the edge of the rail-heads on straight track, and are caused to maintain a slight negative angle with the outer rail-head on curved track, as shown in Fig. 5. Thus the need for complex inter-connections between the rear wheels and forward axles of the car is eliminated.

The invention may be modified in various respects as may occur to those skilled in the art, and exclusive use of all modifications as come within the scope of the appended claims is contemplated.

What is claimed is:

1. In an articulated railway train of at least two cars, an articulated car comprising an intermediate unit and a pair of end units pivotally secured at their inner ends to, and supported by, the adjacent end of said intermediate unit, an intermediate wheeled axle located at each end of the intermediate unit for supporting said intermediate unit and movably mounted with respect thereto, a wheeled axle located at the end of each end unit remote from the intermediate unit for supporting said end unit and movably mounted with respect to the end unit, a coupler carried by each end unit adjacent the remote ends thereof and adapted to connect with a coupler on an adjacent car, means for steering the intermediate axles around curves including connections spaced on either side of the longitudinal axis of the car between each of said intermediate axles and the inner end portions of the adjacent end unit, and additional means including parts projecting outwardly of the remote ends of each end unit spaced on either side of said coupler for cooperating with such means on adjacent cars, said parts being operatively connected to the ends of the end axles to steer the end axles of the end units around curves independently of the couplers.

2. The structure of claim 1 characterized in that the projecting parts are actuated by movements between the adjacent ends of adjacent cars.

3. The structure of claim 1 characterized in that lock means is carried by each end unit and engageable with a portion of said additional means to prevent movement thereof and of the end axles of the end unit of the train.

4. In an articulated railway train of at least two cars, an articulated car comprising an intermediate unit and a pair of end units pivotally secured at their inner ends to and supported by the adjacent end of said intermediate unit, an intermediate wheeled axle located at each end of the intermediate unit for supporting said intermediate unit and movably mounted with respect thereto, a wheeled axle located at the end of each end unit remote from the intermediate unit for supporting said end unit and movably mounted with respect to the end unit, a coupler carried by each end unit adjacent the remote ends thereof and adapted to connect with a coupler on an adjacent car, means for steering the intermediate axles around curves including connections spaced on either side of the longitudinal axis of the car between each of said intermediate axles and the inner end portions of the adjacent unit, and additional means including parts projecting outwardly of the end unit and comprising buffing blocks pivotally connected to the remote ends of the end units on either side of the coupler and operatively connected on either side of the coupler to the axle of the end unit for steering the axles of the end units around curves independently of the couplers.

5. In an articulated railway train of at least two cars, an articulated car comprising an intermediate unit and a pair of end units pivotally secured at their inner ends to and supported by the adjacent end of said intermediate unit, an intermediate wheeled axle located at each end of the intermediate unit for supporting said intermediate unit and movably mounted with respect thereto, a wheeled axle located at the end of each end unit remote from the intermediate unit for supporting said end unit and movably mounted with respect to the end unit, a coupler carried by each end unit adjacent the remote ends thereof and adapted to connect with a coupler on an adjacent car, means for steering the intermediate axles around curves including connections spaced on either side of the longitudinal axis of the car between each of said intermediate axles and the inner end portions of the adjacent unit, and additional means including parts projecting outwardly of the end unit and comprising a pair of members spaced on either side of said coupler pivoted on the remote end of each end unit and operatively connected on either side of said coupler by linkage to the ends of the axle of the respective end unit whereby movement of the members causes corresponding steering movement of the axles of the end units independently of the couplers.

6. In an articulated railway train of at least two cars, an articulated car comprising an intermediate unit and a pair of end units pivotally secured at their inner ends to and supported by the adjacent end of said intermediate unit, an intermediate wheeled axle located at each end of the intermediate unit for supporting said intermediate unit and movably mounted with respect thereto, a wheeled axle located at the end of each end unit remote from the intermediate unit for supporting said end unit and movably mounted with respect to the end unit, a coupler carried by each end unit adjacent the remote ends thereof and adapted to connect with a coupler on an adjacent car, means for steering the intermediate axles around curves including connections spaced on either side of the longitudinal axis of the car between each of said intermediate axles and the inner end portions of the adjacent unit, and additional means including parts projecting outwardly of the end unit and comprising a pair of laterally extending members pivoted on the end of each end unit remote from the intermediate unit and spaced on either side of the coupler, one member being pivoted at its end remote from the coupler and the other member being pivoted at its end adjacent the coupler said members having connections extending on either side of the coupler from their free ends to the ends of the axles of the end units for steering the axles of the end units around curves independently of the couplers.

7. In an articulated railway train of at least two cars, an articulated car comprising an intermediate unit and a pair of end units pivotally secured at their inner ends to and supported by the adjacent end of said intermediate unit, an intermediate wheeled axle located at each end of the intermediate unit for supporting said intermediate unit and movably mounted with respect thereto, a wheeled axle located at the end of each end unit remote from the intermediate unit for supporting said end unit and movably mounted with respect to the end unit, a coupler carried by each end unit adjacent the remote ends thereof and adapted to connect with a coupler on an adjacent car, means for steering the intermediate axles around curves including connections spaced on either side of the longitudinal axis of the car between each of said intermediate axles and the inner end portions of the adjacent unit, and additional means including parts projecting outwardly of the end of the end unit remote from the intermediate unit and comprising a first laterally extending member pivoted adjacent its end remote from the coupler, and a second laterally extending member pivoted adjacent its end adjacent the coupler, said members having connections extending on either side of the coupler between their free ends and the ends of the end unit axle said first and second members being adapted to engage respectively with the second and first members of the end unit of an adjacent car for steering the end axles of the end units around curves independently of the couplers.

8. The structure of claim 7 characterized in that means is provided to connect the engaging members together for positive unitary movement.

9. In an articulated railway train composed of at least two cars adapted to run on rails, independent wheel and axle assemblies supporting the adjacent ends of adjacent cars and movably mounted with respect to the associated car, a coupler carried by each car and adapted to connect the cars together, linkage independent of said couplers and including a first member pivoted to the car end on one side of the coupler and adjacent thereto, and a second member pivoted to the car on the other side of the coupler and remote therefrom, said first and second members of one car engaging with and movable by the second and first members respectively of the adjacent coupled car, said linkage connected on either side of the coupler to its adjacent wheel and axle assembly for controlling certain movements thereof independently of the coupler movement, and said linkage interengaging when the cars are coupled whereby the relative angular movement of said cars controls the steering movements of the adjacent wheel and axle assemblies at the adjacent ends of coupled cars.

10. In an articulated railway train composed of at least two cars adapted to run on rails, each car comprising an intermediate unit having a wheel and axle assembly adjacent each of its ends, each car further comprising two end units, each said end unit having a wheel and axle assembly adjacent one of its ends and further having its other end tractively connected to and supported from an end of said intermediate unit, all of said wheel and axle assemblies being mounted for limited rotation in a horizontal plane with respect to the associated unit, a coupler carried by each car, said couplers being adapted to interengage to connect the cars in train, and means independent of said couplers for guiding said wheel and axle assemblies of said end units, said means including on each end unit a first bracket mounted on an end portion of said unit on one side of said coupler and projecting longitudinally outwardly of said unit toward the adjacent coupled end unit, a second bracket pivotally mounted on said first bracket and projecting longitudinally outwardly therefrom toward the adjacent coupled end unit, a first laterally extending buffing bar, said bar being pivotally connected at its inner end to the outer end of said second bracket, longitudinally extending and longitudinally movable means supported from said end portion and pivotally connected to the outer end of said buffing bar, means operatively connecting said last mentioned means to the adjacent end of said wheel and axle means of the respective end unit for actuating said adjacent end in the same longitudinal direction, a third bracket mounted on said end portion on the opposite side of said coupler and projecting longitudinally outwardly of said first mentioned unit toward said adjacent end unit, a fourth bracket pivotally mounted on said third bracket and projecting longitudinally outwardly therefrom toward said adjacent end unit, a second laterally extending buffing bar, said last mentioned bar being pivotally connected at its outer end to the outer end of said fourth bracket, longitudinally extending and longitudinally movable means supported from said end portion and pivotally connected to the inner end of said second buffing bar, and linkage means operatively connecting said last mentioned means to the adjacent end of said wheel and axle means of the respective end unit for actuating said adjacent end in the same longitudinal direction, said first buffing bar of each end unit engaging along the length of said first bar with said second buffing bar of an adjacent coupled end unit along the length of said second buffing bar, whereby relative angular movement between adjacent coupled end units swings said buffing bars relative to the respective brackets to which said bars are pivotally connected and moves the respective connected axle ends.

11. A structure according to claim 10 and including resilient means connected to said linkage means to maintain said buffing bars in laterally-extending position to facilitate coupling.

12. A structure according to claim 10 and including securing means for firmly connecting together as a unit said first buffing bar of one end unit to said second buffing bar of an adjacent coupled end unit.

References Cited in the file of this patent

UNITED STATES PATENTS

| | | |
|---|---|---|
| 1,810,717 | Lord | June 16, 1931 |
| 2,030,010 | Liechty | Feb. 4, 1936 |
| 2,098,949 | Giessen | Nov. 16, 1937 |
| 2,141,592 | Clar et al. | Dec. 27, 1938 |
| 2,559,540 | McVeigh | July 3, 1951 |
| 2,647,470 | McVeigh | Aug. 4, 1953 |
| 2,782,729 | Heredia | Feb. 26, 1957 |
| 2,823,623 | Heredia | Feb. 18, 1958 |

FOREIGN PATENTS

| | | |
|---|---|---|
| 470,319 | Great Britain | Aug. 12, 1937 |